(12) United States Patent
Griot et al.

(10) Patent No.: US 10,285,114 B2
(45) Date of Patent: May 7, 2019

(54) TECHNIQUES FOR BROADCASTING SERVICE DISCOVERY INFORMATION

(71) Applicant: QUALCOMM Incorporated, San Diego, CA (US)

(72) Inventors: Miguel Griot, La Jolla, CA (US); Madhavan Srinivasan Vajapeyam, San Diego, CA (US); Jun Wang, Poway, CA (US); Ajay Gupta, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 15/205,985

(22) Filed: Jul. 8, 2016

(65) Prior Publication Data
US 2017/0034767 A1    Feb. 2, 2017

Related U.S. Application Data

(60) Provisional application No. 62/198,590, filed on Jul. 29, 2015.

(51) Int. Cl.
*H04W 8/00* (2009.01)
*H04W 48/10* (2009.01)
(Continued)

(52) U.S. Cl.
CPC .......... *H04W 48/10* (2013.01); *H04W 8/005* (2013.01); *H04W 48/12* (2013.01); *H04W 48/16* (2013.01);
(Continued)

(58) Field of Classification Search
CPC ..... H04W 48/10; H04W 48/12; H04W 48/16; H04W 48/20; H04W 8/005; H04W 74/0833; H04W 74/08; H04W 76/023
See application file for complete search history.

(56) References Cited

U.S. PATENT DOCUMENTS

| 8,165,101 B2 * | 4/2012 | Abhishek | H04W 48/18 370/338 |
| 2011/0205955 A1 * | 8/2011 | Xu | H04B 7/155 370/315 |

(Continued)

FOREIGN PATENT DOCUMENTS

| EP | 2 216 964 A1 | 8/2010 |
| WO | WO-2014/187601 A1 | 11/2014 |

OTHER PUBLICATIONS

Ahishakiye F., et al., "Service Discovery Protocols in D2D-enabled Cellular Networks: Reactive Versus Proactive," 2014 IEEE Globecom Workshops (GC Wkshps), IEEE, Dec. 8, 2014 (Dec. 8, 2014), pp. 833-838, XP032747778, DOI: 10.1109/GLOCOMW.2014.7063536 [retrieved on Mar. 18, 2015] III. Protocol Design for Service Discovery; A. Reactive Protocol for Service Discovery; B. Proactive Protocol for Service Discovery.

(Continued)

*Primary Examiner* — Ian N Moore
*Assistant Examiner* — Brian T Le
(74) *Attorney, Agent, or Firm* — Nerrie M. Zohn

(57) ABSTRACT

Neutral host networks may offer one or more different services via one or more different service providers, but user equipment (UE) may not necessarily know which services/service providers are offered by the neutral host networks. Accordingly, nodes of the neutral host networks (e.g., an access point, such as an evolved Node B (eNB)) may transmit service discovery information (SDI) to advertise the one or more services or service providers offered by the node and/or the neutral host network. Thus, a UE can receive the SDI via broadcast by the node, dedicated message from the node, etc., and can accordingly present at least a portion of the SDI or determine whether to connect to the node or (Continued)

another node of the neutral host network based at least in part on the SDI.

26 Claims, 8 Drawing Sheets

(51) Int. Cl.
    *H04W 48/12*    (2009.01)
    *H04W 48/16*    (2009.01)
    *H04W 48/20*    (2009.01)
    *H04W 74/08*    (2009.01)
    *H04W 76/14*    (2018.01)

(52) U.S. Cl.
    CPC ....... *H04W 48/20* (2013.01); *H04W 74/0833* (2013.01); *H04W 76/14* (2018.02)

(56) References Cited

U.S. PATENT DOCUMENTS

| | | |
|---|---|---|
| 2013/0029712 A1 | 1/2013 | Shao et al. |
| 2013/0162771 A1 | 6/2013 | Suh et al. |
| 2014/0031028 A1 | 1/2014 | Yamada et al. |
| 2014/0056220 A1* | 2/2014 | Poitau .................. H04W 76/14 370/328 |

OTHER PUBLICATIONS

International Search Report and Written Opinion—PCT/US2016/041730 —ISA/EPO—dated Jun. 2, 2017. 25 pages.
Poitau G., et al., "A Combined PUSH/PULL Service Discovery Model for LTE Direct," 2014 IEEE 80th Vehicular Technology Conference (VTC2014-Fall), IEEE, Sep. 14, 2014 (Sep. 14, 2014), pp. 1-5, XP032694820, DOI: 10.1109/VTCFALL.2014.6965805 [retrieved on Nov. 24, 2014] I. Introduction; II. Service Discovery Strategies; A. Uncoordinated service discovery; B. Coordinated service discovery.

* cited by examiner

TECHNIQUES FOR BROADCASTING SERVICE DISCOVERY INFORMATION

CLAIM OF PRIORITY UNDER 35 U.S.C. § 119

The present application for patent claims priority to Provisional Application No. 62/198,590 entitled "TECHNIQUES FOR BROADCASTING SERVICE DISCOVERY INFORMATION" filed Jul. 29, 2015, which is assigned to the assignee hereof and hereby expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

Network deployment for these systems is typically fixed, and thus the eNBs communicate with a home network related to a UE to obtain and/or verify subscription information for the UE on a given network. Wireless networks typically employ a home subscriber server (HSS) for managing information relating to UEs subscribed to the wireless network, which may be based on identifying the UE using its international mobile subscriber identifier (IMSI) and/or other identification. In this regard, eNBs providing wireless network access to a UE can communicate with the HSS associated with the UE (e.g., by traversing one or more network nodes) to verify a subscription of the UE. In many examples, the eNB can be on a visiting network and can access the HSS on the home network of the UE to verify the subscription.

There is a desire, however, to allow UEs to communicate using one or more wireless network technologies in other contexts over third-party networks where access and traffic is managed by an owner of the third-party network and/or where frequency bands in unlicensed spectrums are used for communications, and access is allowed by the third party using authentication with credentials from a mobile network operator (MNO) related to the UE or other service providers. These third-party networks can be referred to as neutral host networks such that the entity hosting the network may not be managed by a MNO, and such that traffic need not first traverse an MNO network. In addition, the neutral host network may include one or more eNBs or other access points that may offer different services to one or more UEs via one or more service providers.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Neutral host networks may offer one or more different services via one or more different service providers, but user equipment (UE) may not necessarily know which services/service providers are offered by the neutral host networks. Accordingly, nodes of the neutral host networks (e.g., an access point, such as an evolved Node B (eNB)) may transmit service discovery information (SDI) to advertise the one or more services or service providers offered by the node and/or the neutral host network. Thus, a UE can receive the SDI via broadcast by the node, dedicated message from the node, etc., and can accordingly present at least a portion of the SDI (e.g., on a display to facilitate selection of services) or determine whether to connect to the node or another node of the neutral host network based at least in part on the SDI.

According to an example, a method for communicating SDI in a neutral host network is provided. The method includes detecting, by a processor, a base station associated with the neutral host network, monitoring, by a transceiver, a carrier for a broadcast by the base station including a SDI indicator that indicates that the base station is scheduled to transmit SDI for the neutral host network, and receiving, by the transceiver, the SDI in an additional broadcast by the base station based on the SDI indicator.

In another example, an apparatus for communicating SDI in a neutral host network is provided. The apparatus includes a transceiver, at least one processor communicatively coupled with the transceiver via a bus for communicating signals in the neutral host network, and a memory communicatively coupled with the at least one processor and/or the transceiver via the bus. The at least one processor is configured to detect a base station associated with the neutral host network, monitor, via the transceiver, a carrier for a broadcast by the base station including a SDI indicator that indicates that the base station is scheduled to transmit SDI for the neutral host network, and receive, via the transceiver, the SDI in additional broadcast by the base station based on the SDI indicator.

In yet another example, an apparatus for communicating SDI in a neutral host network is provided. The apparatus includes means for detecting a base station associated with the neutral host network, means for monitoring a carrier for a broadcast by the base station including a SDI indicator that indicates that the base station is scheduled to transmit SDI for the neutral host network, and means for receiving the SDI in an additional broadcast by the base station based on the SDI indicator.

In a further example, a computer-readable medium storing computer executable code for communicating SDI in a neutral host network is provided. The code includes code for detecting a base station associated with the neutral host network, code for monitoring a carrier for a broadcast by the base station including a SDI indicator that indicates that the base station is scheduled to transmit SDI for the neutral host network, and code for receiving the SDI in an additional broadcast by the base station based on the SDI indicator.

According to another example, a method for communicating SDI in a neutral host network is provided. The method includes receiving, by a transceiver, a SDI request from a UE, broadcasting, by the transceiver, an SDI indicator indicating presence of the SDI in one or more subsequent broadcasts, and broadcasting, by the transceiver, SDI in the one or more subsequent broadcasts based at least in part on receiving the SDI request, where the one or more subsequent broadcasts include one or more system information blocks (SIB) or one or more broadcast channels.

In another example, an apparatus for communicating SDI in a neutral host network is provided. The apparatus includes a transceiver, at least one processor communicatively coupled with the transceiver via a bus for communicating signals in the neutral host network, and a memory communicatively coupled with the at least one processor and/or the transceiver via the bus. The at least one processor is configured to receive, via the transceiver, a SDI request from a UE, broadcast, via the transceiver, an SDI indicator indicating presence of the SDI in one or more subsequent broadcasts, and broadcast, via the transceiver, SDI in the one or more subsequent broadcasts based at least in part on receiving the SDI request, where the one or more subsequent broadcasts include one or more SIBs or one or more broadcast channels.

In yet another example, an apparatus for communicating SDI in a neutral host network is provided. The apparatus includes means for receiving a SDI request from a UE, means for broadcasting an SDI indicator indicating presence of the SDI in one or more subsequent broadcasts, and means for broadcasting SDI in the one or more subsequent broadcasts based at least in part on receiving the SDI request, where the one or more subsequent broadcasts include one or more SIBs or one or more broadcast channels.

In a further example, a computer-readable medium storing computer executable code for communicating SDI in a neutral host network is provided. The code includes code for receiving a SDI request from a UE, code for broadcasting an SDI indicator indicating presence of the SDI in one or more subsequent broadcasts, and code for broadcasting SDI in the one or more subsequent broadcasts based at least in part on receiving the SDI request, where the one or more subsequent broadcasts include one or more SIBs or one or more broadcast channels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
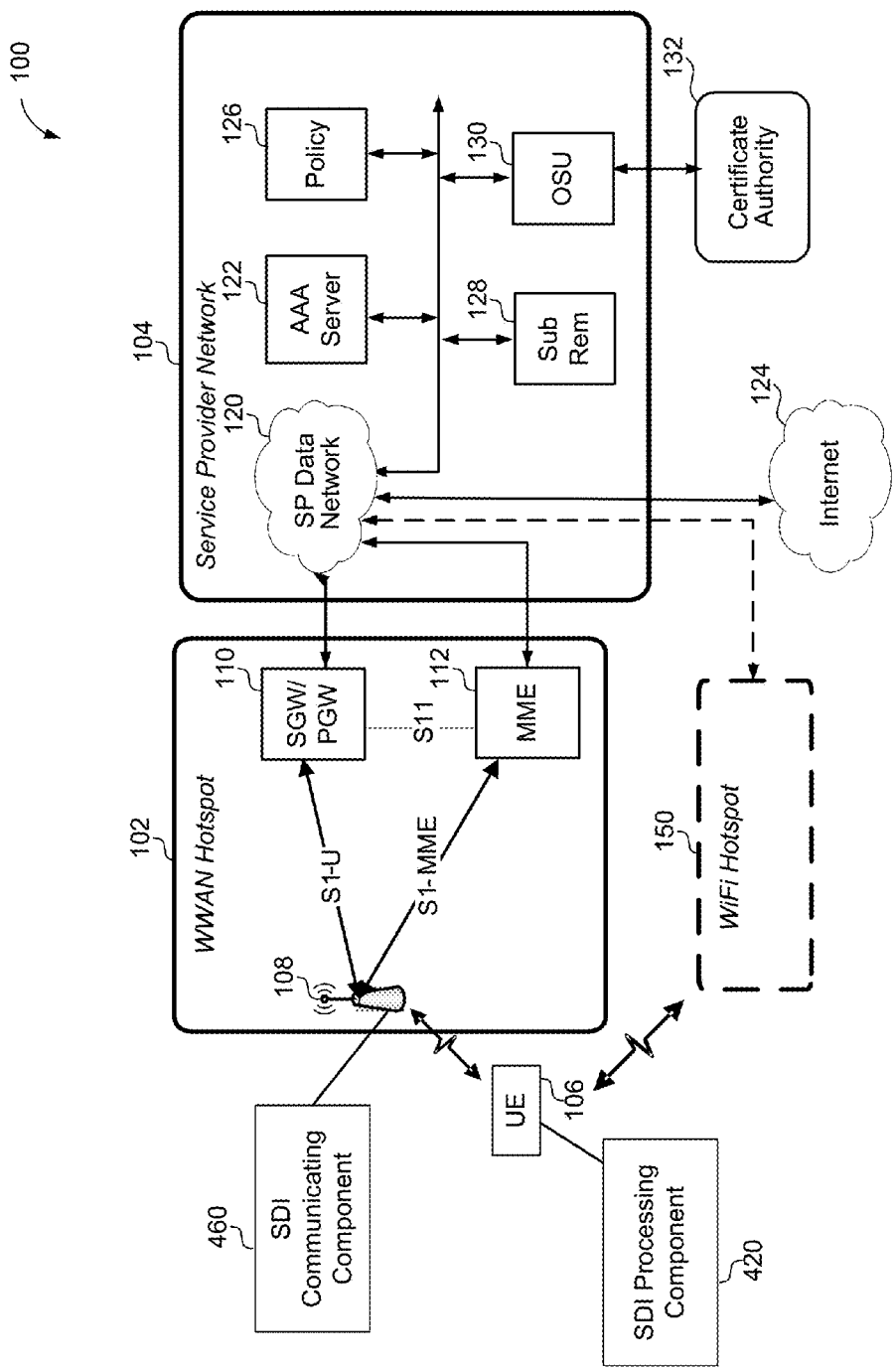
FIG. 1 illustrates an example of a system for providing neutral host network access in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to broadcasting service discovery information (SDI) in a neutral host network, where the SDI can indicate various parameters regarding services offered by one or more service providers in the neutral host network. A neutral host network can include a network that can be operated using a mobile network radio access technology (RAT), such as third generation partnership project (3GPP) long term evolution (LTE), but may not be operated by a mobile network operator (MNO) or otherwise may not be connected directly to an MNO network such that traffic communicated by the neutral host network (e.g., to a user equipment (UE)) need not first traverse an MNO network. For example, as described further herein, a neutral host network may include one or more evolved Node Bs (eNB) or other access points that function as a hotspot based on the mobile network RAT, openly allowing access to devices (e.g., UEs) (e.g., without necessarily requiring authentication for at least certain types of communication in the neutral host network). The eNBs may use alternative forms of authentication for the UEs that may be implemented by the eNBs or a backend network, or using MNO authentication (e.g., universal subscriber identity module (USIM) credentials) by accessing an MNO network via the neutral host network. In one example, the eNB can use system information broadcast mechanisms defined by the mobile network RAT to advertise SDI for the neutral host network.

SDI, for example, can relate to substantially any information regarding services offered by a service provider via the neutral host network broadcasting the SDI. The SDI can be received by a UE for determining whether to select one or more service providers offered by the neutral host network. In one example, the UE may collect SDI for various service providers to present to a user via a user interface or other interface (e.g., an application program interface) to facilitate manual or automatic selection of a service provider or related network/eNB. For example, the SDI may include a service provider name, an operator public land mobile network (PLMN) identifier (ID), information regarding an icon to display for the service provider, credential information for accessing the service provider, portal information for accessing the service provider, a list of service providers offering online sign-up, service provider provisioning server information (e.g., internet protocol (IP) address, provisioning procedures supported, etc.), services supported by the service provider (e.g., connectivity type, as described further herein), and/or the like.

An eNB of the neutral host network may broadcast SDI in system information transmission, e.g., in one or more system information blocks (SIBs), and the UE can obtain the SDI from the system information transmission for determining the SDI associated with the eNB or related neutral host network. In one example, the eNB can also utilize prior system information transmission(s) (e.g., one or more prior SIBs or one or more master information blocks (MIB), etc.) to advertise an SDI indicator, which can indicate the existence of the SDI in one or more subsequent system information transmissions. For example, the SDI indicator may be a bit indicator or other value in the prior system information transmission, where the prior system information transmission can be broadcast by the eNB before the system information transmission that may include the SDI. Thus, the UE can receive the prior system information transmission, and can determine whether the SDI is being broadcast by the eNB based on the SDI indicator. In one example, where the UE determines that the SDI is not broadcast in subsequent system information transmission based on the SDI indicator, the UE may transmit a request to the eNB to broadcast the SDI. The eNB can receive the request and begin broadcasting the SDI (and/or the SDI indicator) allowing on-demand broadcasting of the SDI. This can conserve frequency spectrum and processing resources utilized by the eNB by broadcasting the SDI based on receiving a request and not necessarily in all system information broadcasts.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, single carrier frequency division multiple access (SC-FDMA) and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, a wireless communication system 100 is illustrated that facilitates providing wireless access to a neutral host network (e.g., via an access point operating an SDI communicating component 460 for broadcasting SDI). The wireless communication system 100 includes a wireless wide area network (WWAN) hotspot 102, which can provide a cell to receive wireless communications from one or more UEs to provide access to a backend service provider network 104 (e.g., via one or more other co-located or remotely located network nodes). In this example, the components shown in the WWAN hotspot 102 typically may communicate to provide access to a specific MNO using a mobile network RAT, such as LTE, GSM, etc. In this example, the WWAN hotspot 102 can provide the cell using the mobile network RAT in an unlicensed frequency band to provide access to the backend service provider network 104, where authentication the UE 106 may not be required based on mobile network subscription information (e.g., USIM credentials) as a requirement to access the backend service provider network 104. Thus, for example, a UE 106 communicates with an access point in the form of an eNB 108 to access a serving gateway (SGW)/packet data network (PDN) gateway (PGW) 110 and/or a mobility management entity (MME) 112 using the mobile network RAT. Serving gateway (SGW)/packet data network (PDN) gateway (PGW) 110 and/or a mobility management entity (MME) 112 may be included in the hotspot 102. The UE 106 may operate an SDI processing component 420 for obtaining and processing SDI from eNB 108.

In some aspects, UE 106 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 106 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, or any other similar functioning device. In general, UE 106 may be small and light enough to be considered portable and may be configured to communicate wirelessly via an over-the-air communication link using one or more over-the-air (OTA) communication protocols described herein. Additionally, in some examples, UE 106 may be configured to facilitate communication on multiple separate networks via multiple separate subscriptions, multiple radio links, and/or the like.

The eNB 108 may include an access point, such as a macro cell access point, a small cell access point, and/or the like. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell.

In typical LTE deployments, for example, the MME 112 provides the UE 106 with bearer setup procedures, access to SGW/PGW 110 and other core MNO network components (e.g., an HSS), etc., and SGW/PGW 110 provides the UE 106 with access to an Internet connection and/or other external nodes. In the depicted example, however, SGW/PGW 110 and MME 112 provide the UE 106 with access to service provider (SP) data network 120. The SP data network 120 can optionally relate to providing network access for a WiFi Hotspot 150, and can also be utilized, in this example, by the WWAN Hotspot 102 to additionally provide access to Internet 124 for UE 106 (e.g., to access a home network of the UE 106 for authentication, billing, or other purposes, and/or to access other network nodes to provide wireless network services). This configuration can be referred to as an LTE-U-W deployment, and WWAN hotspot 102 and backend service provider network 104 can be an example of a neutral host network.

In this regard, for example, the MME 112 can setup a bearer for UE 106 to communicate via eNB 108 to access components of the service provider network 104 via SP data network 120. This can include setting up a radio bearer between UE 106 and eNB 108 as well as a data bearer between eNB 108 and SGW/PGW 110 and/or additional components of service provider network 104. In addition, the user and control plane communications may be collapsed for communicating with certain elements in the service provider network 104. Moreover, for example, security can be modified such to use extensible authentication protocol (EAP) or similar security mechanisms over the non-access stratum (NAS) layer between UE 106 and MME 112.

Service provider network 104 may further include an authentication, authorization, and accounting (AAA) server 122 for establishing and verifying credentials of UE 106 for accessing the service provider network 104 (and/or specifically SP data network 120). SP data network 120 can also provide access to Internet 124. Additional servers may optionally be included in the service provider network 104 as well, such as a policy server 126 that can define one or more access policies for a set of credentials, a subscription remediation server 128 that can resolve subscription errors and/or timeouts, and/or an online sign-up (OSU) server 130 for managing subscription credentials for accessing service provider network 104. OSU server 130 can communicate with certificate authority 132 to obtain one or more certificates for managing subscription-based access to service provider network 104. In an example, service provider network 104 can also include a router (not shown) to facilitate WiFi or other wireless access thereto.

In an example, eNB 108 can operate SDI communicating component 460 to advertise the LTE-U-W connectivity type, SDI, etc., which can be discoverable by UE 106, based on the SDI communicating component 460 broadcasting system information indicating these parameters. The UE 106, e.g., via SDI processing component 420, can detect the system information from the eNB 108, and can determine whether to establish a connection with the eNB 108 (e.g., based on the parameters). This can be similar to a mechanism used by components of optional WiFi Hotspot 150 to advertise existence of the Hotspot (e.g., by advertising a network identifier, such as a service set identification (SSID), etc.). Thus, in the LTE-U-W deployment, the service provider can use similar core network elements for provisioning, accounting, policy, authentication, etc. for the WWAN Hotspot 102 as is used for an optional WiFi Hotspot 150. Thus, in some cases, the UE 106 can use the same credentials to access the WWAN Hotspot 102 or the WiFi Hotspot 150, as the credentials can relate to the service provider and/or related service provider network 104. In addition, in some examples, the UE 106 universal subscriber identity module (USIM) (not shown) can be used to provide credentials for accessing the WWAN Hotspot 102 (e.g., where the Hotspot 102 can access MNO components via Internet 124, and/or where WWAN Hotspot 102 otherwise provides LTE-U-M access). Moreover, for example, online sign-up can be possible for both the WWAN Hotspot 102 and WiFi Hotspot 150 via OSU server 130.

Figure 2:
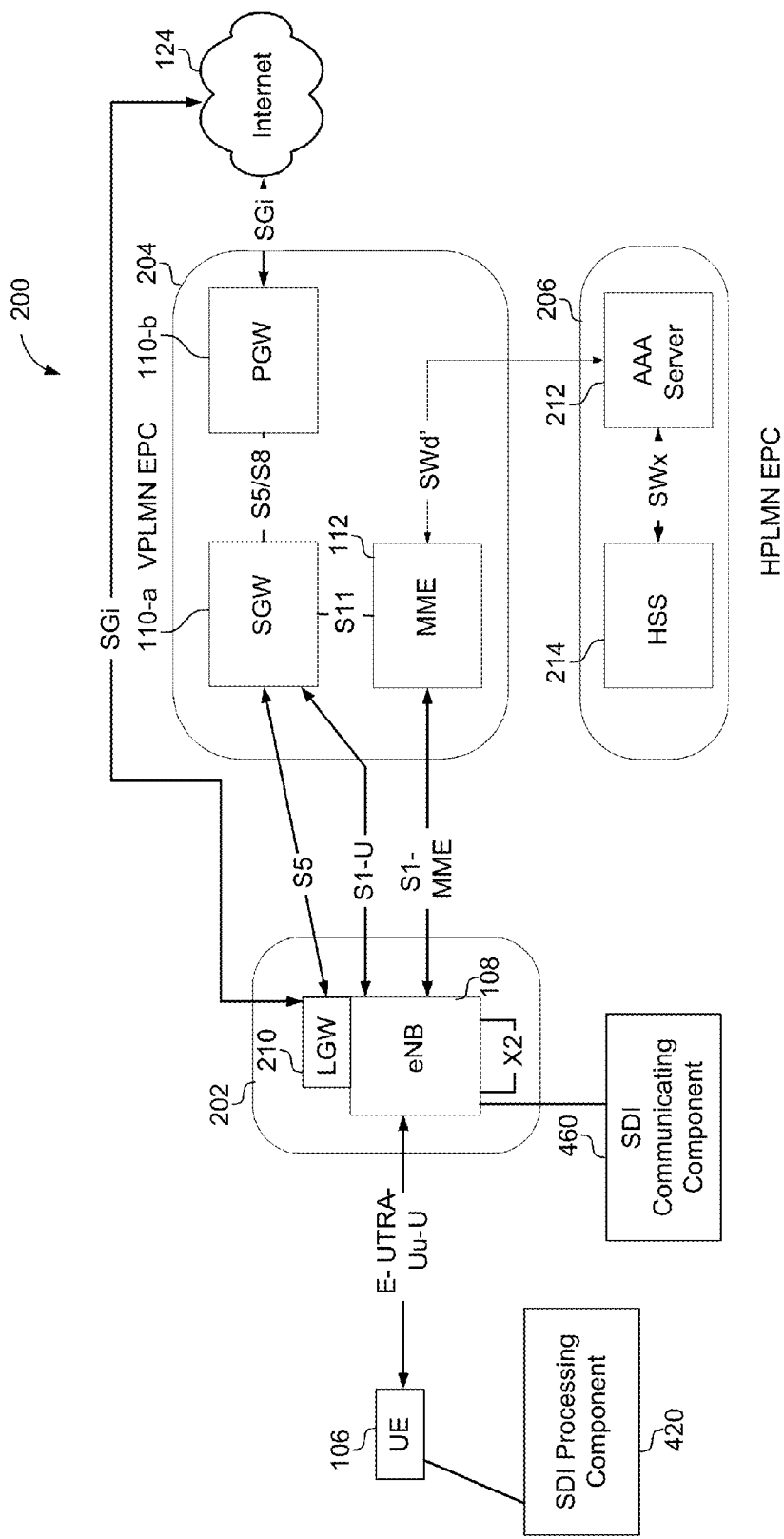
FIG. 2 illustrates another example of a system for providing neutral host network access in accordance with aspects described herein

Referring to FIG. 2, a wireless communication system 200 is illustrated that facilitates providing wireless access to a neutral host network (e.g., via an access point operating an SDI communicating component 460 for broadcasting SDI). Wireless communication system 200 includes a radio hotspot 202 that provides LTE-U for an MNO (LTE-U-M), which may be used to offload traffic from an LTE network (LTE-U-O), where the hotspot 202 communicates with a visiting PLMN (VPLMN) evolved packet core (EPC) 204 to allow access to a home PLMN (HPLMN) EPC 206 that manages credentials for certain UEs. Hotspot 202 and/or the associated VPLMN EPC 204 or HPLMN EPC 206 may represent a neutral host network. VPLMN EPC 204 also provides access to Internet 124 for authenticated UEs. Hotspot 202 includes an eNB 108 and a local gateway (LGW) 210 that facilitate communicating with components of the visiting PLMN (VPLMN) EPC 204 and/or Internet 124. VPLMN EPC 204 is referred to as the visiting PLMN because it is not the HPLMN for UE 106, in this example. VPLMN EPC 204 comprises a SGW 110-a and PGW 110-b (depicted as separate devices, but may be included as a single entity providing SGW and PGW functionality, as shown above and in further examples herein) and an MME 112. HPLMN EPC 206 includes an AAA server 212, which may be different than AAA server 122 of service provider network 104 (FIG. 1) as this AAA server 212 manages AAA functions of the HPLMN EPC for the UE 106, and an HSS 214 for storing subscription information of certain UEs. UE 106 may operate an SDI processing component 420 for obtaining and processing SDI from eNB 108.

In this example, the VPLMN EPC 204 and HPLMN EPC 206 can function as in a typical mobile network to provide UEs related to the HSS 214 of the HPLMN EPC 206 with access to Internet 124 or other network resources based on the VPLMN EPC 204 verifying subscription information of the UE 106 with HPLMN EPC 206. The hotspot 202 can be deployed at a third party that connects to the VPLMN EPC 204 via Internet 124 (e.g., using LGW 210). In this example, eNB 108 operates in an unlicensed frequency spectrum, as with eNB 108 in FIG. 1, to communicate with UE 106, and provides UE 106 with access to Internet 124 by traversing the VPLMN EPC 204 to which hotspot 202 connects, and/or HPLMN EPC 206 related to the UE 106. Thus, for example, UE 106 can use USIM credentials to access hotspot 202, where hotspot 202 verifies the credentials by accessing HPLMN EPC 206. In this regard, the UE 106 can utilize Internet 124 by offloading to hotspot 202 where hotspot 202 is able to authenticate the UE 106 via HPLMN EPC 206.

Figure 3:
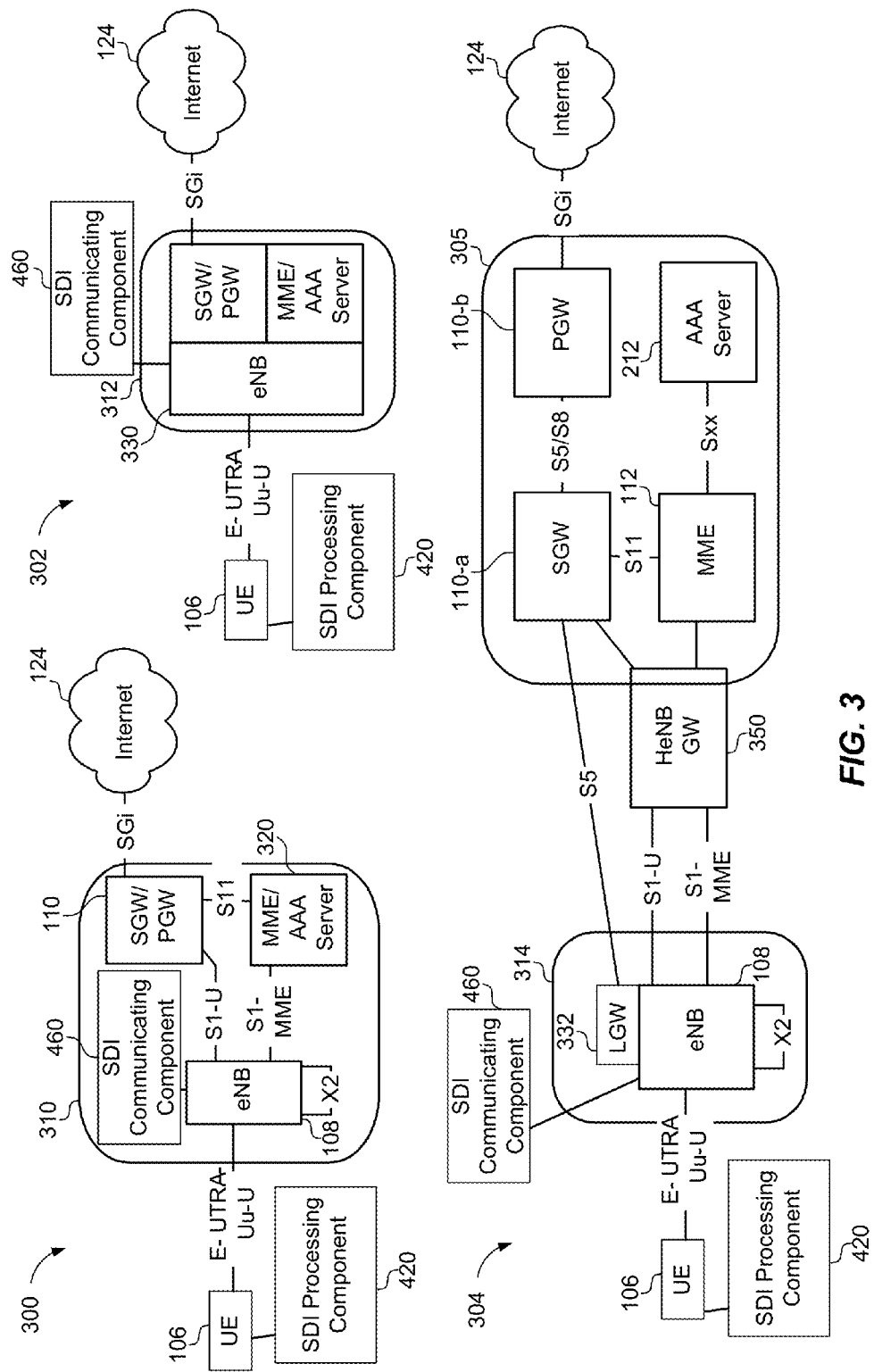
FIG. 3 illustrates yet another example of a system for providing neutral host network access in accordance with aspects described herein

FIG. 3 illustrates example wireless communication systems 300, 302, 304 for providing LTE-U-W access, as described above, without necessarily requiring mobile network authentication (e.g., using USIM credentials) for a corresponding UE 106. Wireless communication system 300 illustrates an example enterprise deployment of a hotspot 310, wireless communication system 302 illustrates an example residential deployment of a hotspot 312, and wireless communication system 304 illustrates an example larger scale deployment of a hotspot 314. Hotspots 310, 312, 314 may be similar to WWAN hotspot 102, for example, in that hotspots 310, 312, 314 can similarly provide access to internet 124 using a mobile network RAT and associated RAN components. Hotspots 310, 312, 314 can be or can provide access to neutral host networks. Each wireless communication system 300, 302, 304 can include a UE 106 that communicates with an eNB 108 to receive access in a neutral host network. For example, an access point (e.g., eNB 108) can operate an SDI communicating component 460 for broadcasting SDI, and UE 106 may operate an SDI processing component 420 for obtaining and processing SDI from eNB 108.

For example, hotspot 310 can include eNB 108 and SGW/PGW 110, much like WWAN hotspot 102, and can also include a combined MME and AAA server 320. Thus, hotspot 310 can communicate using a mobile network RAT to provide access via eNB 108. Hotspot 310 can also authenticate the UE 106 using the AAA portion of MME/AAA server 320, and the MME portion of MME/AAA server 320 can establish one or more bearers for the UE 106 to provide access to internet 124. In hotspot 310, the eNB 108, SGW/PGW 110, and MME/AAA server 320 can be separate components in a network, and/or one or more of the components may be combined.

Hotspot 312, for example, may include a combined eNB, SGW/PGW, and MME/AAA server 330. In this regard, for example, hotspot 312 can be a single device that can be used in a residential setting where the hotspot 312 can be coupled to internet 124 via a connection (e.g., a local area network (LAN) connection, such as Ethernet, wireless LAN, etc.). Thus, hotspot 310 can communicate using a mobile network RAT to provide access via the eNB portion of combined eNB, SGW/PGW, and MME/AAA server 330. Hotspot 310 can also authenticate the UE 106 using the AAA portion of combined eNB, SGW/PGW, and MME/AAA server 330, and the MME portion of combined eNB, SGW/PGW, and MME/AAA server 330 can establish one or more bearers for the UE 106 to provide access to internet 124.

Hotspot 314, in an example, may include an eNB 108 and LGW 210, where the LGW 210 provides access to a service provider network 305, as similarly shown in FIG. 2. In wireless communication system 304, however, the service provider network 305 can include the AAA server 212 for authenticating the UE 106 to utilize the service provider network 305. In addition, wireless communication system 304 includes a HeNB gateway (GW) 350, which can be part of service provider network 305. HeNB GW 350 can facilitate connection of a plurality of hotspots 314 to the service provider network 305 over a network infrastructure, and may communicate with SGW 110-a and/or PGW 110-b to access internet 124. For example, a cable network operator may provide the hotspots 314, and the hotspots 314 may be similar to HeNBs as the hotspots 314 provide wireless communication access using the mobile network RAT via eNB 108. Hotspot 314 may also include an LGW 332 to facilitate communicating with components of the service provider network 305.

In an example, the hotspots 102, 202, 310, 312, 314, etc. in FIGS. 1, 2, 3, may implement functionality described herein to advertise SDI for one or more services or service providers related to the hotspots. For example, the eNB 108 in the hotspots 102, 202, 310, 312, 314 can broadcast the SDI in system information, as described further herein, and UE 106 can obtain the SDI, which may be used to select one or more services for utilization by the UE 106.

Figure 4:
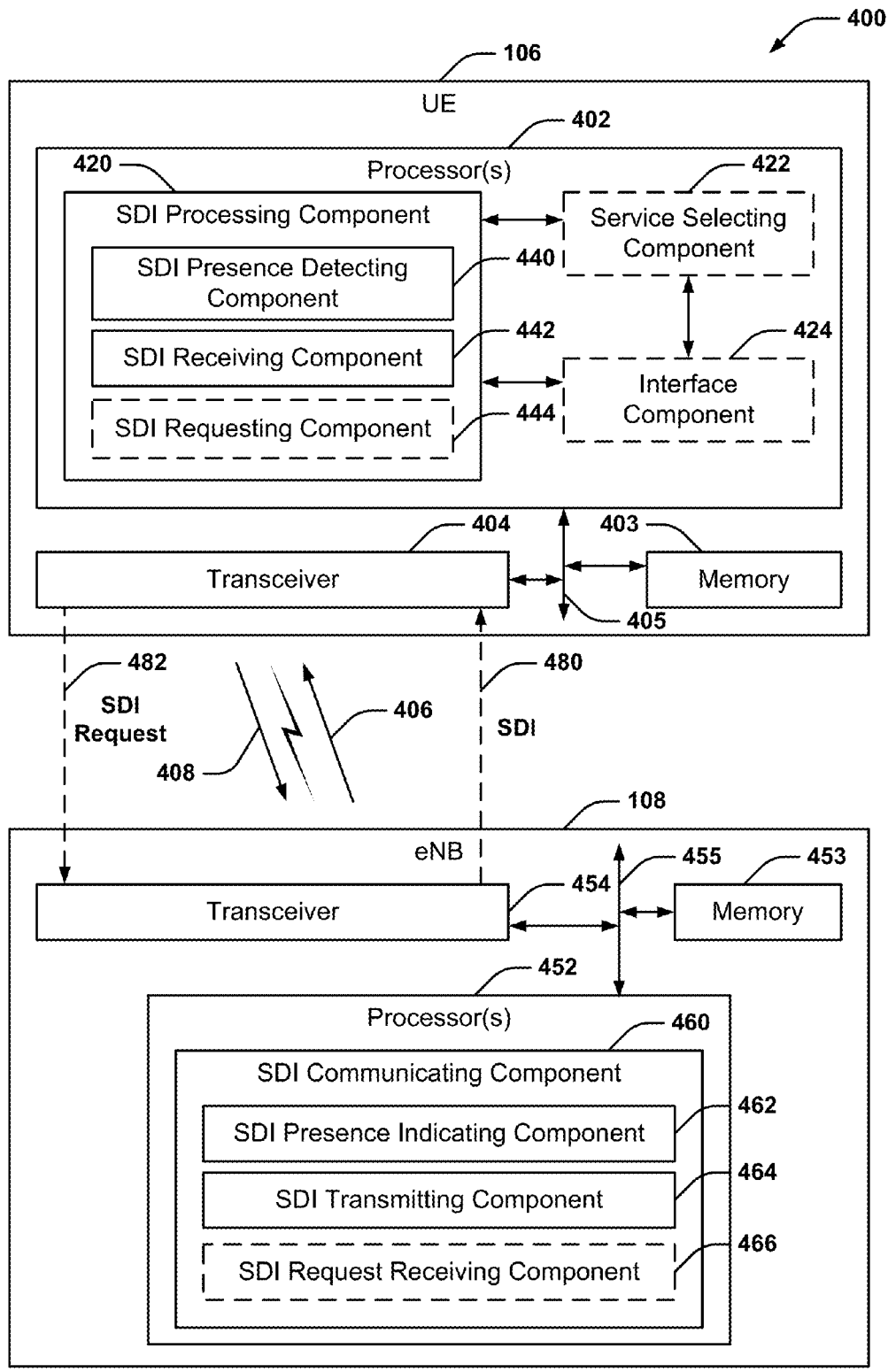
FIG. 4 illustrates an example of a system for communicating service discovery information (SDI) in accordance with aspects described herein.
Figure 5:
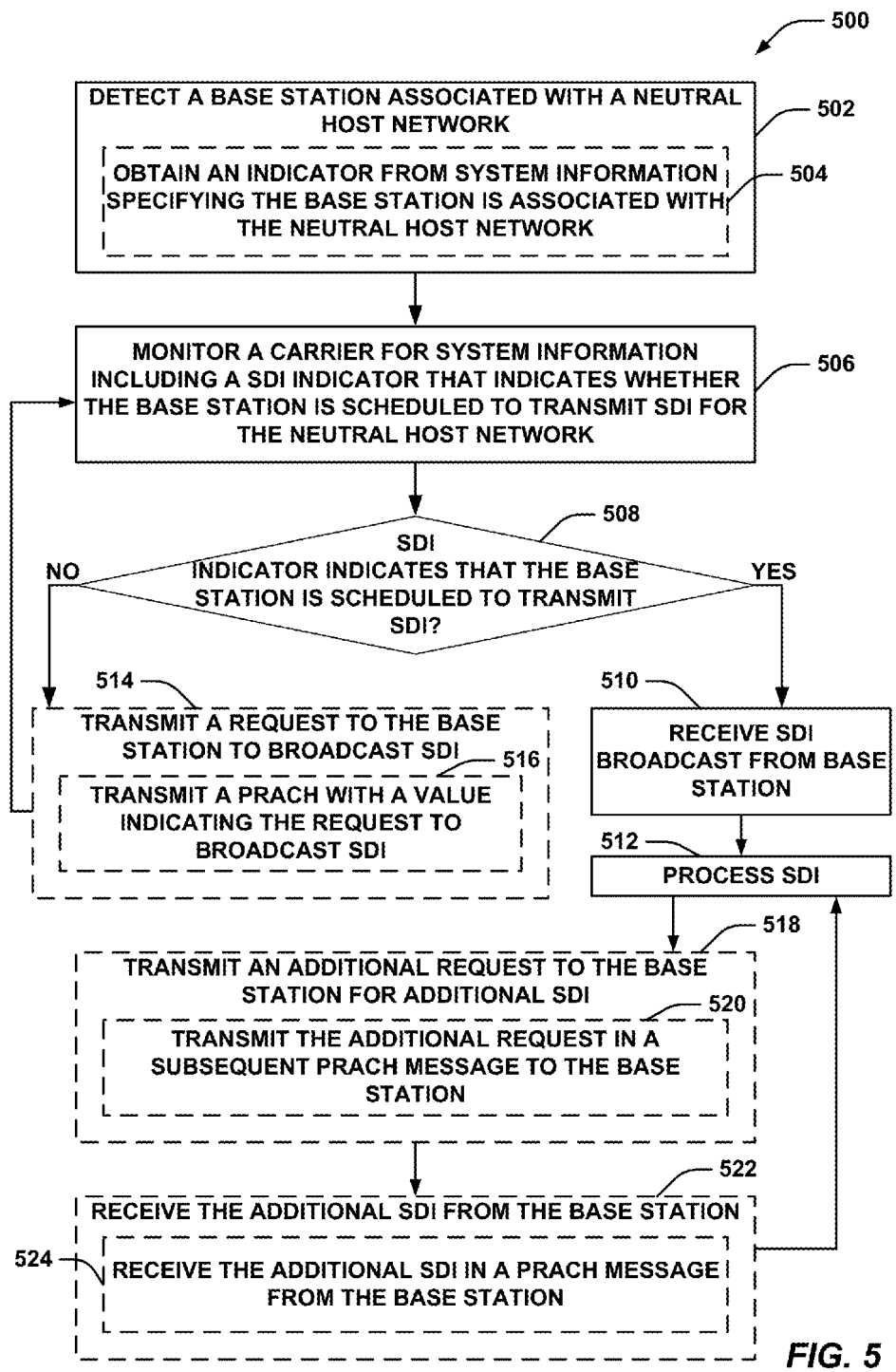
FIG. 5 illustrates an example of a method for receiving and processing SDI in accordance with aspects described herein.
Figure 6:
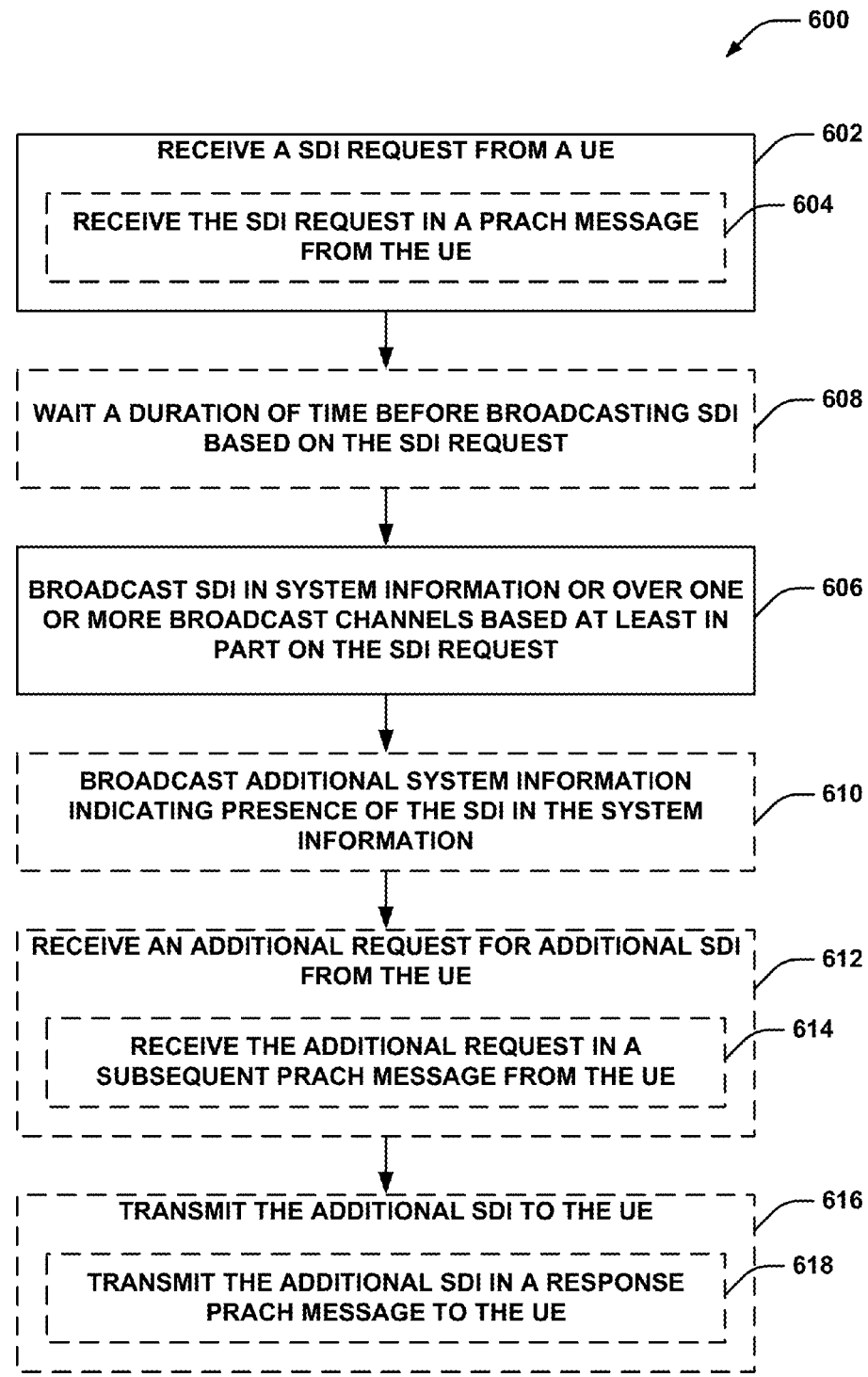
FIG. 6 illustrates an example of a method for broadcasting SDI in accordance with aspects described herein.

Turning now to FIGS. 4-8, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 4 depicts a system 400 for broadcasting and receiving SDI in a wireless communications network. System 400 includes a UE 106 that communicates with an eNB 108 to access a wireless network, examples of which are described in FIGS. 1-3 above. UE 106 can communicate with a wireless network (not shown) via eNB 108. In an aspect, eNB 108 and UE 106 may have established one or more downlink channels over which downlink signals 406 can be transmitted by eNB 108 (e.g., via transceiver 454) and received by UE 106 (e.g., via transceiver 404) for communicating control and/or data messages (e.g., signaling) from the eNB 108 to the UE 106 over configured communication resources. Moreover, for example, eNB 108 and UE 106 may have established one or more uplink channels over which uplink signals 408 can be transmitted by UE 106 (e.g., via transceiver 404) and received by eNB 108 (e.g., via transceiver 454) for communicating control and/or data messages (e.g., signaling) from the UE 106 to the eNB 108 over configured communication resources. For example, eNB 108 may broadcast SDI 480 over a downlink channel in downlink signals 406, which may include a broadcast channel for multiple UEs or a dedicated channel for UE 106. In one example, eNB 108 may broadcast the SDI 480 based on an SDI request 482 from the UE 106 transmitted over an uplink channel in uplink signals 408 to begin broadcasting SDI 480 or otherwise.

In an aspect, UE 106 may include one or more processors 402 and/or a memory 403 that may be communicatively coupled, e.g., via one or more buses 405, and may operate in conjunction with or otherwise implement one or more of a SDI processing component 420 for obtaining and processing SDI that is broadcast or transmitted by one or more eNBs in a neutral host network, an optional service selecting component 422 for selecting one or more services offered by the one or more eNBs based on the SDI, and/or an optional interface component 424 for presenting one or more services offered based on the SDI, allowing selection of the one or more services by an application, a user of the UE 106, and/or the like. For example, the various operations related to SDI processing component 420, service selecting component 422, interface component 424, etc., may be implemented or otherwise executed by one or more processors 402 and, in an aspect, can be executed by a single processor, while in other aspects, different ones of the operations may be executed by a combination of two or more different processors. For example, in an aspect, the one or more processors 402 may include any one or any combination of a modem processor, or a baseband processor, or a digital signal processor, or an application specific integrated circuit (ASIC), or a transmit processor, or a transceiver processor associated with transceiver 404. Further, for example, the memory 403 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 402. Moreover, memory 403 or computer-readable storage medium may be resident in the one or more processors 402, external to the one or more processors 402, distributed across multiple entities including the one or more processors 402, etc.

In particular, the one or more processors 402 and/or memory 403 may execute actions or operations defined by SDI processing component 420 or its subcomponents. For instance, the one or more processors 402 and/or memory 403 may execute actions or operations defined by SDI presence detecting component 440 for detecting whether SDI is present in system information received from an eNB 108. In an aspect, for example, SDI presence detecting component 440 may include hardware (e.g., one or more processor modules of the one or more processors 402) and/or computer-readable code or instructions stored in memory 403 and executable by at least one of the one or more processors 402 to perform the specially configured SDI presence detecting operations described herein. Further, for instance, the one or more processors 402 and/or memory 403 may execute actions or operations defined by SDI receiving component 442 for receiving SDI from the eNB 108 broadcast in system information or otherwise transmitted by eNB 108. In an aspect, for example, SDI receiving component 442 may include hardware (e.g., one or more processor modules of the one or more processors 402) and/or computer-readable code or instructions stored in memory 403 and executable by at least one of the one or more processors 402 to perform the specially configured SDI receiving operations described herein. Further, for instance, the one or more processors 402 and/or memory 403 may optionally execute actions or operations defined by SDI requesting component 444 for requesting the eNB 108 to broadcast or otherwise transmit SDI. In an aspect, for example, SDI requesting component 444 may include hardware (e.g., one or more processor modules of the one or more processors 402) and/or computer-readable code or instructions stored in memory 403 and executable by at least one of the one or more processors 402 to perform the specially configured SDI requesting operations described herein.

Similarly, in an aspect, eNB 108 may include one or more processors 452 and/or a memory 453 that may be communicatively coupled, e.g., via one or more buses 455, and may operate in conjunction with or otherwise implement a SDI communicating component 460 for broadcasting or otherwise transmitting SDI in a neutral host network. For example, the various functions related to SDI communicating component 460 may be implemented or otherwise executed by one or more processors 452 and, in an aspect, can be executed by a single processor, while in other aspects, different ones of the functions may be executed by a combination of two or more different processors, as described above. In one example, the one or more processors 452 and/or memory 453 may be configured as described in examples above with respect to the one or more processors 402 and/or memory 403 of UE 106.

In an example, the one or more processors 452 and/or memory 453 may execute actions or operations defined by SDI communicating component 460 or its subcomponents. For instance, the one or more processors 452 and/or memory 453 may execute actions or operations defined by SDI presence indicating component 462 for indicating whether SDI is present in system information communicated by eNB 108. In an aspect, for example, SDI presence indicating component 462 may include hardware (e.g., one or more processor modules of the one or more processors 452) and/or computer-readable code or instructions stored in memory 453 and executable by at least one of the one or more processors 452 to perform the specially configured SDI presence indicating operations described herein. Further, for instance, the one or more processors 452 and/or memory 453 may execute actions or operations defined by SDI transmitting component 464 for broadcasting or otherwise transmitting SDI in a neutral host network. In an aspect, for example, SDI transmitting component 464 may include hardware (e.g., one or more processor modules of the one or more processors 452) and/or computer-readable code or instructions stored in memory 453 and executable by at least one of the one or more processors 452 to perform the specially configured SDI transmitting operations described herein. Further, for instance, the one or more processors 452 and/or memory 453 may optionally execute actions or operations defined by SDI request receiving component 466 for requesting the eNB 108 to receiving one or more requests for the eNB 108 to broadcast or otherwise transmit SDI. In an aspect, for example, SDI request receiving component 466 may include hardware (e.g., one or more processor modules of the one or more processors 452) and/or computer-readable code or instructions stored in memory 453 and executable by at least one of the one or more processors 452 to perform the specially configured SDI request receiving operations described herein.

Transceivers 404, 454, in an example, may be configured to transmit and receive wireless signals through one or more antenna, an RF front end, one or more transmitters, and one or more receivers. In an aspect, transceivers 404, 454 may be tuned to operate at specified frequencies such that UE 106 and/or eNB 108 can communicate at a certain frequency. In an aspect, the one or more processors 402 may configure transceiver 404 and/or one or more processors 452 may configure transceiver 454 to operate at a specified frequency and power level based on a configuration, a communication protocol, etc.

In an aspect, transceivers 404, 454 can operate in multiple bands (e.g., using a multiband-multimode modem, not shown) such to process digital data sent and received using transceivers 404, 454. In an aspect, transceivers 404, 454 can be multiband and be configured to support multiple frequency bands for a specific communications protocol. In an aspect, transceivers 404, 454 can be configured to support multiple operating networks and communications protocols. Thus, for example, transceivers 404, 454 may enable transmission and/or reception of signals based on a specified modem configuration.

Referring to FIG. 5, an example of a method 500 is illustrated for receiving SDI broadcast in a neutral host network (e.g., by a UE 106 operating a SDI processing component 420). In method 500, blocks indicated as dashed boxes represent optional steps.

Method 500 includes, at Block 502, detecting a base station associated with a neutral host network. In an aspect, service selecting component 422 (FIG. 4) of UE 106, e.g., in conjunction with processor(s) 402, memory 403, and/or transceiver 404, can detect the base station (e.g., eNB 108) associated with a neutral host network. For example, service selecting component 422 can periodically detect presence of one or more base stations (e.g., as part of a cell reselection or handover procedure) for determining available base stations and/or associated services for selection by UE 106. For example, service selecting component 422 may utilize transceiver 404 to detect signals received from the one or more base stations (e.g., eNB 108), which may include system information transmitted by the one or more base stations. Thus, in an example, detecting that the base station associated with a neutral host network at Block 502 may optionally include, at Block 504, obtaining an indication from system information specifying the base station is associated with the neutral host network. In one example, signals received from the one or more base stations may include neutral host network information, such as an indicator to indicate a connectivity type supported by the base stations (e.g., LTE, LTE-U-W, LTE-U-M, LTE-U-O, other LTE networks operating in unlicensed frequency bands, such as MuLTEfire, LTE-license assisted access (LTE-LAA), etc., and/or the like). Accordingly, in an example, service selecting component 422 may obtain an indication from system information (e.g. neutral host network information) received from the base station, where the system information may specify that the base station (e.g., eNB 108) is associated with the neutral host network, which may include one or more signals indicating a supported connectivity type of LTE-U-W, LTE-U-M, LTE-U-O, MuLTEfire, LTE-LAA, etc. In an example, SDI communicating component 460 may generate and/or otherwise initialize an indicator of the connectivity type in system information broadcast by eNB 108.

Method 500 may also include, at Block 506, monitoring a carrier for system information including a SDI indicator that indicates whether the base station is scheduled to transmit SDI for the neutral host network. In an aspect, SDI presence detecting component 440 of UE 106, e.g., in conjunction with processor(s) 402, memory 403, and/or transceiver 404, can monitor the carrier (e.g., via transceiver 404) for system information including an SDI indicator that indicates whether the base station is scheduled to transmit SDI for the neutral host network. For example, UE 106 may know the carrier based on detecting signals from the eNB 108 over the carrier, based on a configuration, and/or the like. In any case, the carrier may correspond to one or more carriers or other frequency resources corresponding to a radio access technology (e.g., LTE, WiFi, etc.) operated by the eNB 108. For example, the SDI indicator may be broadcast by the base station (e.g., eNB 108) in system information over the carrier prior to broadcasting or otherwise transmitting SDI 480. In a specific example, eNB 108 may broadcast the SDI indicator in one or more SIBs, MIBs, etc., which may include an initial one or more SIBs or MIBs communicated by eNB 108 transmitted before a SIB or other communication that can include the SDI. In one example, eNB 108 may broadcast the SDI indicator in the same SIB which indicates connectivity type(s) supported by the eNB 108. Using a SDI indicator in this regard can enable the eNB 108 to refrain from sending the SDI by default, which can save on spectrum and processing overhead. In an example, SDI presence indicating component 462 can generate or otherwise initialize the SDI indicator to indicate whether SDI communicating component 460 is scheduled to communicate SDI 480 in a subsequent broadcast.

Method 500 also includes, at Block 508, determining whether the SDI indicator indicates that the base station is scheduled to transmit SDI. In an aspect, SDI presence detecting component 440 of UE 106, e.g., in conjunction with processor(s) 402, memory 403, and/or transceiver 404, can determine whether the SDI indicator indicates that the base station (e.g., eNB 108) is scheduled to transmit SDI. For example, the SDI indicator may be a bit value in the SIB. MIB, etc., and SDI presence detecting component 440 may accordingly determine whether the SDI indicator indicates that the eNB 108 is scheduled to transmit SDI based on the value. In one example, SDI presence detecting component 440 may determine whether the SDI indicator is present at all, and where the indicator is not present can determine that the eNB 108 is not scheduled to transmit SDI (or does not support transmission of SDI, etc.).

Where the SDI indicator indicates that the base station is scheduled to transmit SDI at Block 508, the method may further include, at Block 510, receiving SDI broadcast from the base station. In an aspect, SDI receiving component 442 of UE 106, e.g., in conjunction with processor(s) 402, memory 403, and/or transceiver 404, can receive (e.g., via transceiver 404) the SDI 480 broadcast from the base station (e.g., from eNB 108). For example, SDI receiving component 442 can receive the SDI 480 in one or more SIBs that are subsequent to a SIB, MIB, etc. that includes the SIB indicator, which can be based on receiving the SDI indicator. For example, SDI transmitting component 464 can broadcast SDI 480 in the one or more SIBs based on the indicated SDI indicator. In an example, the SDI indicator may additionally specify one or more parameters related to the SDI (e.g., an index of a SIB including the SDI, a position of the SDI within one or more SIBs, a size of the SDI, and/or the like).

Method 500 also includes, at Block 512, processing the SDI. In an aspect, SDI processing component 420, e.g., in conjunction with processor(s) 402, memory 403, and/or transceiver 404, may process the SDI. For example, SDI processing component 420 of UE 106 may associate at least a portion of the SDI 480 with the eNB 108. SDI processing component 420, for example, may generate a list of eNBs and/or related services to which UE 106 can request access, for providing to service selecting component 422 to facilitate selecting an eNB or related service, based on the SDI. In one example, service selecting component 422 may present the list to interface component 424, which may include a graphical user interface displayed on a display of the UE 106 (not shown), an application program interface accessible by one or more applications executing on the one or more processors 402, etc. In any case, for example, interface component 424 may facilitate selection of the one or more eNBs or related services as specified in the SDI 480, and UE 106 can accordingly request access to the one or more eNBs or related services via transceiver 404. In another example, service selecting component 422 may automatically select the eNB 108 or related services based on determining one or more services indicated in or otherwise related to the SDI 480 received from eNB 108. Selection of the eNB 108 or the related service in this regard may include service selecting component 422 requesting access to one or more services from eNB 108, in one example. Thus, in one example based on processing of the SDI, service selecting component 422 may identify a preferred service provider or a preferred MNO PLMN as indicated in the SDI, and can initiate a connection to the eNB 108 to access the preferred service provider and/or PLMN.

Where the SDI indicator does not indicate that the base station is scheduled to transmit SDI at Block 508, method 500 can optionally include, at Block 514, transmitting a request to the base station to broadcast SDI. In an aspect, SDI requesting component 444 of UE 106, e.g., in conjunction with processor(s) 402, memory 403, and/or transceiver 404, can transmit (e.g., via transceiver 404) the SDI request 482 to the base station (e.g., eNB 108) to broadcast SDI. In one example, SDI requesting component 444 can transmit the SDI request 482 in a non-access stratum (NAS) message before the UE 106 is attached to the eNB 108. In one example, transmitting the NAS message can include SDI requesting component 444 transmitting the SDI request 482 as part of an initial access channel request to initiate a radio resource control (RRC) connection with (e.g., attach to) eNB 108. Specifically, in an example, transmitting the request at Block 514 may optionally include, at Block 516, transmitting a physical random access channel (PRACH) with a value indicating the request to broadcast SDI. In an aspect, SDI requesting component 444, e.g., in conjunction with processor(s) 402, memory 403, and/or transceiver 404, can transmit the PRACH request (e.g., SDI request 482) with the value (e.g., cause code) indicating the request to broadcast SDI. For example, SDI requesting component 444 can transmit the PRACH request on an access channel provided by the eNB 108 to initiate communications with the eNB 108 where the PRACH request may include the value indicating the request to broadcast SDI. In another example, SDI requesting component 444 can transmit the SDI request 482 over a RRC message once RRC resources are established between UE 106 and eNB 108, or otherwise using unicast signaling, an access stratum (AS) message, etc. In an example, the SDI request 482 can also be a PRACH message in the random access procedure to establish communications between UE 106 and eNB 108.

In any case, after transmitting the request at Block 514, method 500 can continue to Block 506 to monitor the carrier for system information including the SDI indicator that indicates that the base station is scheduled to transmit SDI for the neutral host network. As described further below, the eNB 108 may not immediately begin broadcasting SDI based on the SDI request 482 from UE 106; thus, the UE 106 may continue monitoring the carrier for a period of time, after which the UE 106 may again transmit the SDI request to eNB 108 or otherwise determine that the eNB 108 is not transmitted SDI 480, for example.

In one example, the SDI 480 broadcast by eNB 108 may include a partial SDI (e.g., a partial set of the SDI) including a portion of (e.g., a subset of) available SDI information from eNB 108 (e.g., an indication of one or more service providers or mobile network operator public land mobile networks that support the neutral host network). Upon receiving the partial SDI, UE 106 may determine whether to request additional SDI for providing to the service selecting component 422. Thus, the UE 106 need not receive and process, and the eNB 108 need not necessarily broadcast/transmit, all available SDI by default. Where the UE 106 determines to receive additional SDI, for example, after processing the SDI at Block 512 (or after receiving the SDI broadcast at Block 510), method 500 may also optionally include, at Block 518, transmitting an additional request to the base station for additional SDI. In an aspect, SDI requesting component 444, e.g., in conjunction with processor(s) 402, memory 403, and/or transceiver 404, can transmit the additional request to the base station (e.g., eNB 108) for additional SDI. For example, SDI requesting component 444 can transmit the additional request using unicast signaling over resources granted to the UE 106 by eNB 108. Using unicast signaling for the additional information, for example, can conserve broadcast resources by allowing the eNB 108 to broadcast the partial SDI (e.g., on demand as described or otherwise) while transmitting further SDI upon request from one or more UEs by using dedicated signaling to the requesting UE(s).

In one example, transmitting the additional request at Block 518 may optionally include, at Block 520, transmitting the additional request in a subsequent PRACH message to the base station. In an aspect, SDI requesting component 444 of UE 106, e.g., in conjunction with processor(s) 402, memory 403, and/or transceiver 404, can transmit the additional request in the subsequent PRACH message to the base station (e.g., to eNB 108). For example, the subsequent PRACH message may include another message in the random access procedure to establish a connection with eNB 108. For example, eNB 108 can grant RRC resources to the UE 106 in response to an initial PRACH message received from the UE 106 (which may have included an initial request for the eNB 108 to broadcast SDI, as described), and the RRC resources for communicating another PRACH message can also be used to request the additional SDI. For example, the additional SDI can include one or more other portions of SDI, such as an indication of whether online credential provisioning is available for one or more service providers related to the eNB 108, whether the one or more service providers offer online signup, one or more services offered by the eNB 108, one or more access point names offered by the eNB 108, or an icon for the one or more service providers, etc.

Method 500 may also optionally include, at Block 522, receiving the additional SDI from the base station. SDI receiving component 442 of UE 106, e.g., in conjunction with processor(s) 402, memory 403, and/or transceiver 404, can receive (e.g., via transceiver 404) the additional SDI from the base station (e.g., eNB 108). For example, SDI receiving component 442 can receive the additional SDI in unicast signaling from the eNB 108 (e.g., in RRC resources granted by the eNB 108 to UE 106 for receiving communications therefrom). In a specific example, receiving the additional SDI at Block 522 may optionally include, at Block 524, receiving the additional SDI in a PRACH message from the base station. In an aspect, SDI receiving component 442 of UE 106, e.g., in conjunction with processor(s) 402, memory 403, and/or transceiver 404, can receive the additional SDI in the PRACH message from the base station (e.g., from eNB 108). For example, the PRACH message may include a PRACH response message to the subsequent PRACH message transmitted by UE 106. In any case, SDI receiving component 442 can receive the SDI in multiple broadcasts and/or transmissions from the eNB 108, in this example, which can be transmitted by SDI transmitting component 464. Method 500 can then continue to Block 512 where the SDI can be processed, as described above.

FIG. 6 illustrates an example of a method 600 for broadcasting or otherwise transmitting SDI in a neutral host network (e.g., by an eNB operating an SDI communicating component 460). In method 600, blocks indicated as dashed boxes represent optional steps.

Method 600 includes, at Block 602, receiving a SDI request from a UE. In an aspect, SDI request receiving component 466 of eNB 108, e.g., in conjunction with processor(s) 452, memory 453, and/or transceiver 454, can receive the SDI request 482 from the UE 106. For example, SDI request receiving component 466 can receive the SDI request 482 in a request sent by the UE 106 in unicast signaling over one or more uplink channels previously established with the UE 106. In another example, receiving the SDI request at Block 602 may optionally include, at Block 604, receiving the SDI request in a PRACH message from the UE. In an aspect, SDI request receiving component 466, e.g., in conjunction with processor(s) 452, memory 453, and/or transceiver 454, can receive the SDI request 482 in the PRACH message from the UE 106, which may be received over an access channel as part of a random access procedure to establish a connection between UE 106 and eNB 108. For example, SDI request receiving component 466 can determine that the UE 106 is requesting the eNB 108 to broadcast SDI based on a value specified in the PRACH message (e.g., a cause code for the PRACH message).

Method 600 also includes, at Block 606, broadcasting SDI in system information or over one or more broadcast channels based at least in part on the SDI request. In an aspect, SDI transmitting component 464 of eNB 108, e.g., in conjunction with processor(s) 452, memory 453, and/or transceiver 454, can broadcast SDI (e.g., via transceiver 454) in system information or over one or more broadcast channels based at least in part on SDI request 482. For example, SDI transmitting component 464 can broadcast system information in one or more SIBs transmitted over a carrier, as described, where a new SIB can be defined for communicating SDI (referred to herein as SIBxx). In another example, SDI transmitting component 464 can broadcast the SDI over one or more broadcast channels (e.g., a primary broadcast channel (PBCH) in LTE) over the carrier, which the UE 106 can monitor (e.g., based on a known or received configuration corresponding to the carrier or otherwise detecting signals transmitted over the carrier) for receiving the SDI.

In an example, method 600 may optionally include, at Block 608, waiting a duration of time before broadcasting SDI based on the SDI request. In an aspect, SDI transmitting component 464 of eNB 108, e.g., in conjunction with processor(s) 452, memory 453, and/or transceiver 454, can wait the duration of time before broadcasting SDI based on the SDI request. For example, the duration of time can be configured at the eNB 108 to allow other UEs to possibly request and/or receive the SDI. In one example, the duration of time may relate to or be determined based on detecting one or more events, such as the SDI request receiving component 466 detecting at least a threshold number of SDI requests received from one or more UEs before SDI transmitting component 464 broadcasts the SDI.

Moreover, method 600 may optionally include, at Block 610, broadcasting additional system information indicating presence of the SDI in the system information. In an aspect, SDI presence indicating component 462 of eNB 108, e.g., in conjunction with processor(s) 452, memory 453, and/or transceiver 454, can broadcast the additional system information indicating presence of the SDI 480 (e.g., an SDI indicator) in the system information. For example, SDI presence indicating component 462 can broadcast the additional system information including the SDI indicator in a SIB, MIB, etc. (referred to herein as eSIB) prior to a SIB or other communication including the SDI 480 (e.g., prior to SIBxx). Using the SDI indicator in this regard can allow UEs to detect the presence of the SDI before attempting to receive the SDI in the subsequent SIB or other communication. As described, the SDI indicator can include a bit value in the prior SIB, MIB, etc., which can be initialized to a certain value or included in the SIB, MIB, etc., where the SDI is transmitted in the subsequent SIB.

As described in one example, the SDI broadcast by eNB 108 may be a partial SDI including a portion of the available SDI. Thus, method 600 may also optionally include, at Block 612, receiving an additional request for additional SDI from the UE. In an aspect, SDI request receiving component 466 of eNB 108, e.g., in conjunction with processor(s) 452, memory 453, and/or transceiver 454, can receive (e.g., via transceiver 454) the additional request for the additional SDI from the UE 106, which may be based on the UE 106 receiving the partial SDI and desiring to receive additional SDI for the eNB 108. In one example, described above, the UE 106 can transmit the additional request in unicast signaling to the eNB 108, which may be over resources granted to the UE 106 by eNB 108 (e.g., RRC layer resources). In an example, receiving the additional request at Block 612 may optionally include, at Block 614, receiving the additional request in a subsequent PRACH message from the UE. In an aspect, SDI request receiving component 466 of eNB 108, e.g., in conjunction with processor(s) 452, memory 453, and/or transceiver 454, may receive the additional request in the subsequent PRACH message from the UE 106. For example, the subsequent PRACH message may be subsequent to a PRACH message in which an initial request for the eNB 108 to broadcast SDI is received. The subsequent PRACH message may be part of the same random access procedure between the UE 106 and eNB 108 to establish a connection therebetween, as described.

Method 600 may also optionally include, at Block 616, transmitting the additional SDI to the UE. In an aspect, SDI transmitting component 464, e.g., in conjunction with processor(s) 452, memory 453, and/or transceiver 454, can transmit (e.g., via transceiver 454) the additional SDI to the UE 106. For example, SDI transmitting component 464 of eNB 108 can transmit the additional SDI in response to the additional SDI request received from the UE 106, and may accordingly transmit the additional SDI in unicast signaling to the UE 106 (e.g., over RRC resources granted to the UE 106 by eNB 108). Thus, transmitting the additional SDI at Block 616 may optionally include, at Block 618, transmitting the additional SDI in a response to the PRACH message. As described, SDI transmitting component 464, e.g., in conjunction with processor(s) 452, memory 453, and/or transceiver 454, may transmit the additional SDI in another PRACH message in response to the subsequent PRACH message received from UE 106 as part of the random access procedure. In any case, UE 106 can receive and process the SDI, as described above.

Figure 7:
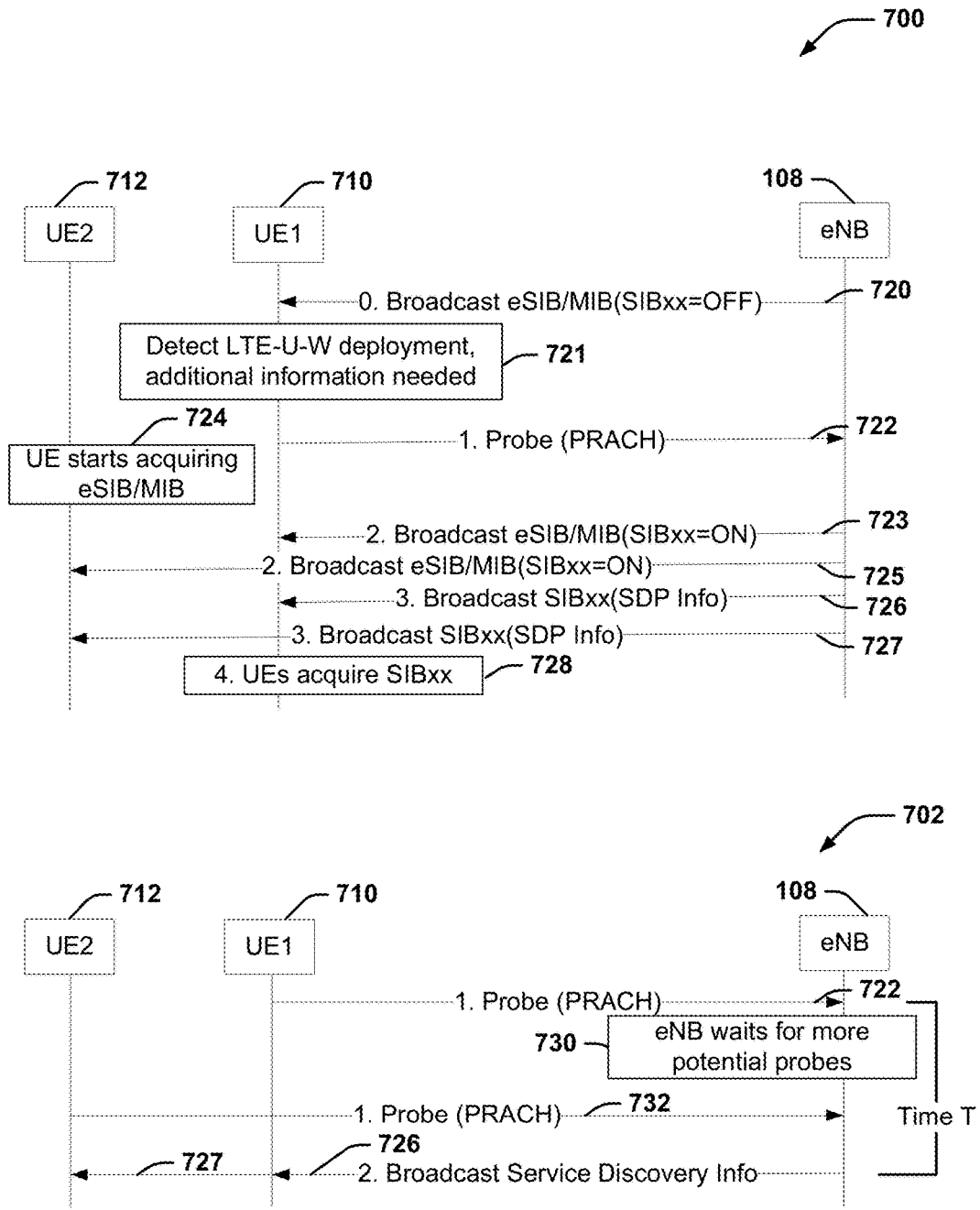
FIG. 7 illustrates an example of a system and message flow between one or more UEs and an eNB thereof for communicating SDI according to aspects described herein.

FIG. 7 illustrates examples of systems 700, 702 and message flows between components thereof including communications between one or more UEs 106, 710, 712 and an eNB 108, in accordance with aspects described above. For example, system 700 includes a UE1 710 and UE2 712 communicating with eNB 108, where each of UE1 710 and UE2 712 may be similar to UE 106 shown and described in FIGS. 1-4. In this example, eNB 108 can broadcast an enhanced SIB (eSIB) or MIB 720, which may include an indicator SIBxx=OFF indicating that the SIB carrying SDI (SIBxx) is not scheduled for transmission by eNB 108. The eSIB or MIB may correspond to an initial SIB broadcast that may include one or more SIBs defined in a mobile network RAT (e.g., LTE), a MIB, etc., as described. UE1 710 can receive the eSIB or MIB 720, and can detect LTE-U-W deployment and that additional information is needed at 721. The UE can be searching for LTE-U-W/M/O networks (e.g., neutral host networks) to find service providers/operators offering service via this network. For example, the eSIB or MIB 720 can indicate a connectivity type of LTE-U-W for the eNB 108, and this connectivity type can cause UE1 710 to detect the LTE-U-W deployment and that additional SDI is requested or otherwise desired.

UE1 can accordingly transmit a probe 722 to eNB 108, which may be in the form of an initial PRACH message, to indicate a request for the eNB 108 to begin broadcasting SDI. This can cause eNB 108 to begin broadcasting eSIB or MIB 723 indicating SIBxx=ON (e.g., that SDI is scheduled for transmission by eNB 108). In an example, UE2 712 may start acquiring eSIB or MIB from one or more eNBs at 724, which may include eNB 108. Thus, UE2 712 can also receive the eSIB or MIB 725 indicating SIBxx=ON (e.g., without specifically probing eNB 108). Accordingly, eNB 108 broadcasts SIBxx with the SDI (also referred to as service discovery protocol (SDP) info) 726, 727. UE1 710 can acquire SIBxx at 728 to obtain the SDI from eNB 108, and UE2 712 can also acquire SIBxx at 728 to obtain the SDI from the eNB 108 at 726. Because the UE1 710 can check the SDI indicator before requesting SDI, this example can be suitable where a number of UEs enter an area covered by eNB 108 at a similar time, and thus each UE need not request SDI transmission from the eNB 108.

System 702 includes UE1 701, UE2 712, and eNB 108. In this system 702, eNB 108 receives the probe 722 from UE1, as described in system 700. eNB 108 can wait a duration of time T to potentially receive additional probes from additional UEs, such as probe 732 from UE2 712. Probe 732 may also be a PRACH request from UE2 712. After time T, eNB 108 can broadcast SDI (e.g., in SIBxx) 726, 727. In either system 700, 702, for instance, the SDI may be limited to providing service providers and MNO PLMNs that offer service via the LTE-U-O/W (neutral host) network corresponding to the eNB 108. More detailed information, such as whether online provisioning is available for a specific service provider, services offered, APNs offered, etc., can be provided over RRC signaling, as described herein.

Figure 8:
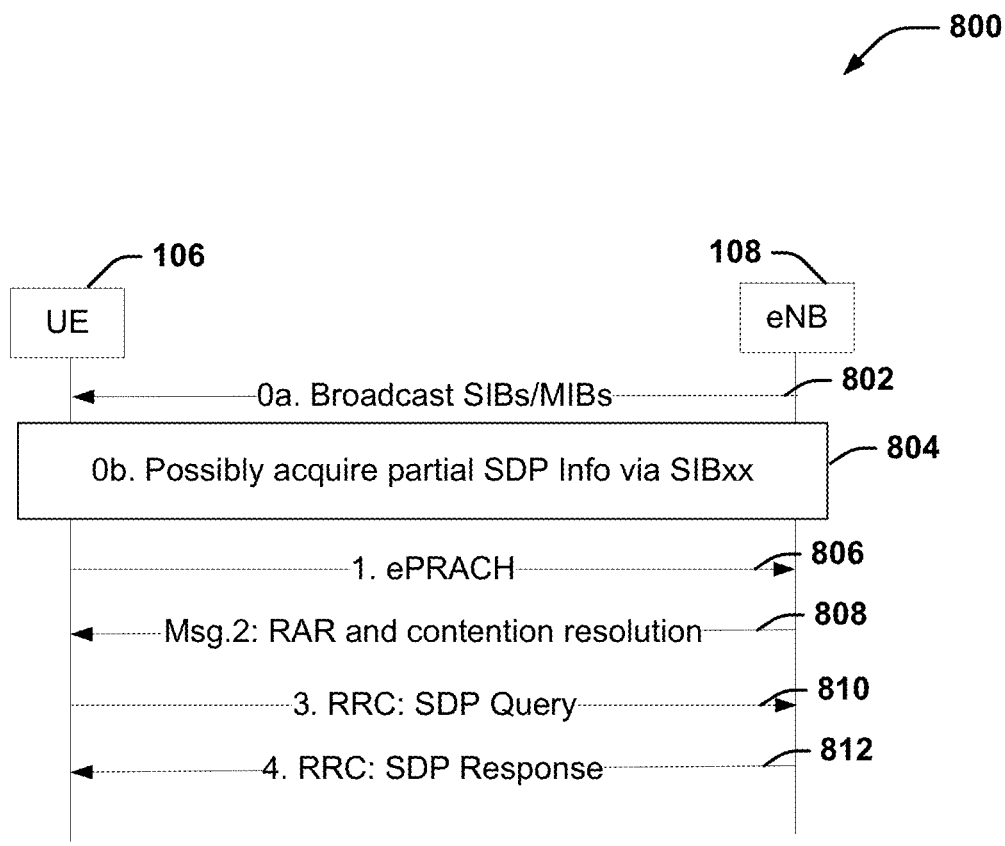
FIG. 8 illustrates an example of a system and message flow between a UE and an eNB thereof for communicating partial SDI according to aspects described herein.

FIG. 8 illustrates an example of a system 800 and a message flow between components thereof for communicating partial SDI. System 800 includes a UE 106 and eNB 108, which can communicate in a wireless network, as described. For example, eNB 108 can broadcast SIBs and/or MIBs 802, which can be received by UE 106. The SIBs/MIBs may indicate whether SIBxx is being broadcast, may include partial SDI, which may be acquired via SIBxx at 804, etc. UE 106 may transmit an enhanced PRACH 806 to eNB 108 to establish a unicast connection (e.g., an RRC connection) therewith, as described. In one example (e.g., where the partial SDI is not received at 804), the ePRACH may include a value to request eNB 108 to begin transmitting SDI. In any case, eNB 108 can transmit a random access response (RAR) 808 (e.g., with contention resolution) to UE 106 to establish the RRC connection. UE 106 can then transmit an RRC message 810 (referred to as message 3 in PRACH procedures) to eNB 108, which may also include a request for additional SDI (e.g., an SDP query). eNB 108 can respond with another RRC message 812 (referred to as message 4 in PRACH procedures) to UE 106, which may also include the additional SDI (e.g., a SDP response).

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for communicating service discovery information (SDI) in a neutral host network, comprising:
    detecting, by a processor, a base station associated with the neutral host network;
    monitoring, by a transceiver, a carrier for a broadcast by the base station including a SDI indicator that indicates that the base station is scheduled to transmit the SDI for the neutral host network;
    determining, based on the SDI indicator, whether the base station is scheduled to transmit the SDI for the neutral host network in a subsequent broadcast;
    transmitting, based at least in part on determining that the SDI indicator indicates that the base station is not scheduled to broadcast the SDI, a SDI request to the base station to request that the base station broadcast the SDI; and
    receiving, by the transceiver and based on transmitting the SDI request, the SDI in the subsequent broadcast by the base station.

2. The method of claim 1, wherein detecting the base station is associated with the neutral host network further comprises receiving neutral host network information in the broadcast, wherein the neutral host network information identifies the base station as being associated with the neutral host network.

3. The method of claim 1, wherein transmitting the SDI request comprises transmitting a physical random access channel (PRACH) request having a value to indicate the SDI request.

4. The method of claim 1, further comprising:
    monitoring a broadcast channel transmitted of the base station for the SDI in response to transmitting the SDI request; and
    receiving the SDI on the broadcast channel.

5. The method of claim 1, wherein receiving the SDI comprises receiving a partial SDI, and further comprising:
    establishing a unicast connection with the base station;
    transmitting a request for additional SDI to the base station in a physical random access channel (PRACH) message sent over the unicast connection; and
    receiving the additional SDI from the base station over the unicast connection.

6. The method of claim 5, wherein the partial SDI comprises an indication of one or more service providers or mobile network operator public land mobile networks that support the neutral host network, and the additional SDI comprises at least one or more of an indication of whether online credential provisioning is available for the one or more service providers, whether the one or more service providers offer online signup, one or more services offered by the base station, one or more access point names offered by the base station, or an icon for the one or more service providers.

7. The method of claim 1, wherein the SDI comprises an indication of one or more service providers or mobile network operator public land mobile networks that support the neutral host network.

8. The method of claim 7, wherein the SDI further comprises at least one or more of an indication of whether online credential provisioning is available for the one or more service providers, whether the one or more service providers offer online signup, one or more services offered by the base station, one or more access point names offered by the base station, or an icon for the one or more service providers.

9. The method of claim 1, further comprising displaying the base station in a list of one or more base stations provided on a user interface configured to allow selection of the one or more base stations for wireless access, wherein displaying the base station in the list of one or more base stations is based at least in part on the SDI.

10. The method of claim 9, further comprising initiating a connection with the one or more base stations based on selection of the one or more base stations via the user interface.

11. The method of claim 1, further comprising:
identifying a preferred service provider or a preferred mobile network operator public land mobile networks and a corresponding preferred service in the SDI; and
initiating a connection with the base station to access the preferred service provider or the preferred mobile network operator public land mobile networks and the corresponding preferred service.

12. The method of claim 1, wherein monitoring the carrier comprises monitoring the carrier for a system information block or a master information block broadcast by the base station that indicates that the base station is scheduled to transmit SDI.

13. An apparatus for communicating service discovery information (SDI) in a neutral host network, comprising:
a transceiver;
at least one processor communicatively coupled with the transceiver via a bus for communicating signals in the neutral host network; and
a memory communicatively coupled with at least one of the at least one processor or the transceiver via the bus;
wherein the at least one processor is configured to:
detect a base station associated with the neutral host network;
monitor, via the transceiver, a carrier for a broadcast by the base station including a SDI indicator that indicates that the base station is scheduled to transmit the SDI for the neutral host network;
determine, based on the SDI indicator, whether the base station is scheduled to transmit the SDI for the neutral host network in a subsequent broadcast;
transmit, based at least in part on determining that the SDI indicator indicates that the base station is not scheduled to broadcast the SDI, a SDI request to the base station to request that the base station broadcast the SDI; and
receive, via the transceiver and based on transmitting the SDI request, the SDI in the subsequent broadcast by the base station.

14. The apparatus of claim 13, wherein the at least one processor is configured to detect the base station is associated with the neutral host network based at least in part on receiving neutral host network information in the broadcast, wherein the neutral host network information identifies the base station as being associated with the neutral host network.

15. The apparatus of claim 13, wherein the at least one processor is configured to receive a partial SDI, and is further configured to:
establish a unicast connection with the base station;
transmit a request for additional SDI to the base station in a physical random access channel (PRACH) message sent over the unicast connection; and
receive the additional SDI from the base station over the unicast connection.

16. The apparatus of claim 13, wherein the SDI comprises an indication of one or more service providers or mobile network operator public land mobile networks that support the neutral host network.

17. The apparatus of claim 13, wherein the at least one processor is further configured to display the base station in a list of one or more base stations provided on a user interface configured to allow selection of the one or more base stations for wireless access, wherein displaying the base station in the list of one or more base stations is based at least in part on the SDI.

18. The apparatus of claim 13, wherein the at least one processor is further configured to:
identify a preferred service provider or a preferred mobile network operator public land mobile networks and a corresponding preferred service in the SDI; and
initiate a connection with the base station to access the preferred service provider or the preferred mobile network operator public land mobile networks and the corresponding preferred service.

19. The apparatus of claim 13, wherein the at least one processor is configured to monitor the carrier for a system information block or a master information block broadcast by the base station that indicates that the base station is scheduled to transmit the SDI.

20. An apparatus for communicating service discovery information (SDI) in a neutral host network, comprising:
means for detecting a base station associated with the neutral host network;
means for monitoring a carrier for a broadcast by the base station including a SDI indicator that indicates that the base station is scheduled to transmit the SDI for the neutral host network;
means for determining, based on the SDI indicator, whether the base station is scheduled to transmit the SDI for the neutral host network in a subsequent broadcast;
means for transmitting, based at least in part on determining that the SDI indicator indicates that the base station is not scheduled to broadcast the SDI, a SDI request to the base station to request that the base station broadcast the SDI; and
means for receiving, based on transmitting the SDI request, the SDI in the subsequent broadcast by the base station.

21. The apparatus of claim 20, wherein the means for detecting detects the base station associated with the neutral host network at least in part by receiving neutral host network information in the broadcast, wherein the neutral host network information identifies the base station as being associated with the neutral host network.

22. The apparatus of claim 20, wherein the means for receiving the SDI is configured to:
receive the SDI as a partial SDI;
establish a unicast connection with the base station;
transmit a request for additional SDI to the base station in a physical random access channel (PRACH) message sent over the unicast connection; and
receive the additional SDI from the base station over the unicast connection.

23. The apparatus of claim 20, wherein the SDI comprises an indication of one or more service providers or mobile network operator public land mobile networks that support the neutral host network.

24. A non-transitory computer-readable medium, comprising code executable by one or more processors for communicating service discovery information (SDI) in a neutral host network, the code comprising:
code for detecting a base station associated with the neutral host network;
code for monitoring a carrier for a broadcast by the base station including a SDI indicator that indicates that the base station is scheduled to transmit the SDI for the neutral host network;

code for determining, based on the SDI indicator, whether the base station is scheduled to transmit the SDI for the neutral host network in a subsequent broadcast;

code for transmitting, based at least in part on determining that the SDI indicator indicates that the base station is not scheduled to broadcast the SDI, a SDI request to the base station to request that the base station broadcast the SDI; and code for receiving, based on transmitting the SDI request, the SDI in the subsequent broadcast by the base station.

25. The non-transitory computer-readable medium of claim 24, wherein the code for detecting detects the base station associated with the neutral host network at least in part by receiving neutral host network information in the broadcast, wherein the neutral host network information identifies the base station as being associated with the neutral host network.

26. The non-transitory computer-readable medium of claim 24, wherein the code for receiving the SDI is configured to:

receive the SDI as a partial SDI;
establish a unicast connection with the base station;
transmit a request for additional SDI to the base station in a physical random access channel (PRACH) message sent over the unicast connection; and
receive the additional SDI from the base station over the unicast connection.

\* \* \* \* \*